Patented Oct. 30, 1934

1,979,055

UNITED STATES PATENT OFFICE 1,979,055

WATER-INSOLUBLE AZODYESTUFFS AND FIBER DYED THEREWITH

Karl Schnitzspahn and Wilhelm Koch, Offenbach-on-the-Main, Germany, assignors to General Aniline Works, Inc., New York, N. Y., a corporation of Delaware No Drawing. Application June 10, 1933, Serial No. 675,327. In Germany June 17, 1932

14 Claims. (Cl. 260—95)

The present invention relates to valuable water-insoluble azodyestuffs and to fiber dyed therewith; more particularly it relates to compounds corresponding to the following probable general formula:

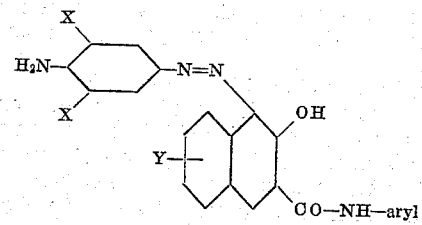

wherein X stands for halogen and Y for hydrogen, halogen or alkoxy.

These azodyestuffs are obtainable by coupling 2,6-dihalogen-1,4-diaminobenzenes, monodiazotized in 4-position, with arylides of 2,3-hydroxynaphthoic acid or derivatives thereof, substituted in the naphthalene radical, only such components being used as do not contain sulfonic acid or carboxylic acid groups.

There are thus obtained dyestuffs of good fastness properties, which have the particular advantage of being completely fast to acids in spite of the presence of a free amino group in the molecule. The dyestuffs may be used for the preparation of pigments and also for the preparation of fast dyeings and printings on vegetable and animal fibers.

The present process is of particular technical value inasmuch as it allows to obtain in the direct printing process brown tints beside other tints as, for instance, orange, red, blue and black tints on one and the same ground by means of a uniform diazo compound which could, hitherto, only be attained by means of mixtures of diazo compounds.

When producing the present dyestuffs on the fiber, the 4-monodiazo compounds of 2,6-dihalogen-1,4-diaminobenzenes are advantageously used in the form of stabilized diazo salts as, for instance, diazonium-sulfates, diazonium-aryl-sulfonates, zinc chloride double salts of diazonium salts.

The following examples serve to illustrate the invention, but they are not intended to limit it thereto, the parts being by weight, unless otherwise stated:

(1) 177 parts of 2,6-dichloro-1,4-diaminobenzene are introduced into a mixture of 305 parts of hydrochloric acid of 20° Bé. and 3540 parts of water, and to the suspension of the hydrochloride there is gradually added a solution of 72 parts of sodium nitrite in 150 parts of water. The monodiazo solution, thus obtained, is run into a solution of 276 parts of 2,3-hydroxynaphthoyl-aminobenzene in dilute caustic soda solution to which there has been added the quantity of sodium carbonate, necessary for binding the excess of mineral acid and Turkey red oil. The precipitated dyestuff which corresponds to the following probable formula:

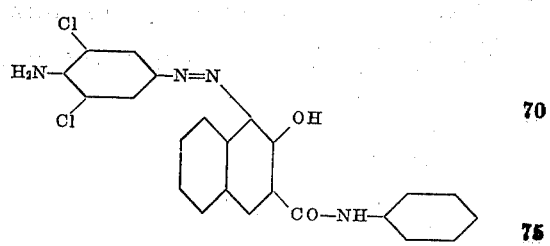

is filtered by suction and washed well. When producing the dyestuff in the usual manner on a substratum adapted for the production of lakes, a bluish Bordeaux red lake is obtained.

(2) Well boiled and dried cotton yarn is impregnated with a solution which contains per liter, 4,5 grams of 2',3'-hydroxynaphthoyl-1-amino-2,5-dimethoxybenzene, 9 cc. of caustic soda solution of 34° Bé. and 10 cc. of Turkey red oil, the yarn is well freed from water by wringing and developed with a neutral or feebly acetic acid diazo solution which contains per liter, 1.77 grams of 2,6-dichloro-1,4-diaminobenzene as monodiazo compound, rinsed and soaped.

A Bordeaux dyeing of good fastness to light is thus obtained.

By developing the dyestuff from the same diazo compound and 2,3-hydroxynaphthoyl-1-amino-4-methylbenzene on viscose artificial silk, a garnet dyeing is obtained.

(3) Cotton yarn which has been pretreated as described in Example 2 is impregnated with a solution which contains per liter, 7.5 grams of 2',3'-hydroxynaphthoyl-1-amino-4-methoxy-2-methylbenzene, 15 cc. of caustic soda solution of 34° Bé. and 15 cc. of Turkey red oil and the yarn is developed as described in Example 2.

A dark currant dyeing of a very good fastness to light is thus obtained.

(4) Well boiled and dried cotton yarn is impregnated with a solution which contains per liter, 6.5 grams of 2,3-hydroxynaphthoyl-1-amino-2-methylbenzene, 10 cc. of caustic soda solution of 34° Bé. and 10 cc. of Turkey red oil, the yarn is well freed from water by wringing and developed with a neutral or feebly acetic acid diazo solution which contains per liter, 2.66 grams of 2,6-dibromo-1,4-diaminobenzene as monodiazo compound, rinsed and soaped.

A reddish brown dyeing of good fastness to light is obtained.

The dyestuff corresponds to the following probable formula:

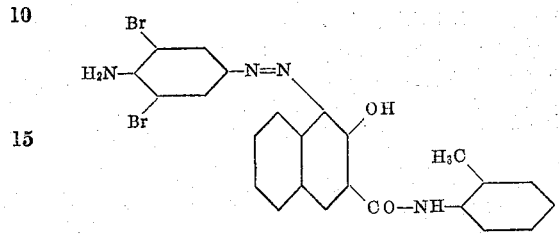

(5) Cotton yarn which has been pretreated in the usual manner is impregnated with a solution which contains per liter, 4 grams of 2',3'-hydroxynaphthoyl-1-amino-4-methoxy-naphthalene, 8 cc. of caustic soda solution of 34° Bé. and 10 cc. of Turkey red oil, the yarn is well freed from water by wringing and developed with a neutral or feebly acetic acid diazo solution which contains per liter, 2.22 grams of 2-chloro-6-bromo-1,4-diaminobenzene as monodiazo compound, rinsed and soaped.

A brownish garnet dyeing of good fastness to light is obtained.

The dyestuff corresponds to the following probable formula:

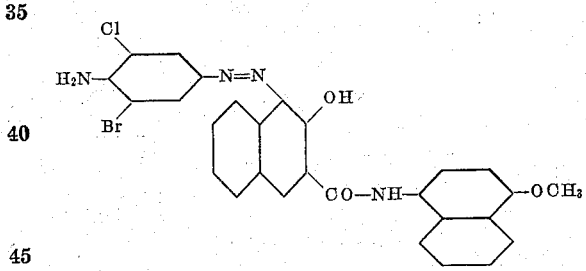

(6) *Print upon a naphthol preparation*

The material to be printed is grounded with a solution which contains per liter: 20 grams of 2',3'-hydroxynaphthoyl-1-amino-2-methoxybenzene, 30 cc. of Turkey red oil and 30 cc. of caustic soda solution of 34° Bé., and dried. The material, thus impregnated, is printed, side by side, with the following two mixtures:

(a) 23 grams of acid sulfate of the monodiazo compound of 2,6-dichloro-1,4-diaminobenzene containing 54% of the base, 450 cc. of water, 12 grams of sodium acetate, 500 grams of neutral starch tragacanth thickening, 15 grams of acetic acid of 50% strength;

(b) 57 grams of fluoborate of the diazo compound of 1-amino-3-chlorobenzene containing 15.1% of the base, 428 cc. of water, 15 grams of acetic acid of 50% strength, 500 grams of neutral starch tragacanth thickening.

After printing, the material is dried, rinsed with a hot sodium carbonate solution (containing 2 grams of calcined sodium carbonate per liter) and soaped at the boil.

A full reddish brown dyeing beside a vivid orange is obtained.

(7) *Discharge print*

The material, grounded as described in Example 6, is developed in the usual manner with a solution of 29 grams of zinc chloride double salt of the 4-monodiazo compound of 2,6-dichloro-1,4-diaminobenzene containing 43% of the base and 12 grams of sodium acetate in 1000 cc. of cold water and, thereupon, soaped at the boil and dried. The material, thus dyed, is printed with the following discharge paste:

Sodium formaldehyde sulfoxylate____ 200 grams
Water_____ 210 cc.
Potash_____ 30 grams
Sodium salt of benzyl sulfanilic acid__ 30 grams
Anthraquinone paste of 30% strength_ 30 grams
British gum thickening_____ 500 grams Thereupon, the material is dried, steamed for 5 to 7 minutes at 100° C. in a rapid ager, rinsed, while hot, and soaped at the boil.

A white effect on a full reddish brown ground is thus obtained.

(8) 1 liter of padding solution is prepared by means of 2 grams of 2',3'-hydroxynaphthoyl-1-amino-3-nitrobenzene, 3 cc. of caustic soda solution of 34° Bé. and 5 cc. of Turkey red oil with addition of one of the usual protective agents for silk, for instance, 2.5 grams of purified sulfite cellulose waste liquor brought into a powdery form.

Degummed spun silk is grounded in this solution, squeezed and developed, with addition of a small quantity of acetic acid, in a solution which contains per liter, 3.3 grams of acid sulfate of the 4-monodiazo compound of 2,6-dichloro-1,4-diaminobenzene containing 54% of the base, to which there has been added the quantity of sodium acetate necessary for rendering the solution neutral to Congo paper.

After rinsing, acidifying and soaping at the boil, a reddish brown dyeing is obtained.

(9) At 40° C. to 50° C., wool is impregnated with a solution which contains per liter, 1 gram of 2',3'-hydroxynaphthoyl-1-amino-2-methoxybenzene, 1.5 cc. of caustic soda solution of 34° Bé., 2 cc. of Turkey red oil, 20 grams of sodium chloride and one of the usual protective agents for wool, for instance, 0.5 gram of purified sulfite cellulose waste liquor brought into a powdery form; the wool is squeezed and developed in a solution which contains per liter, 3.3 grams of acid sulfate of the 4-monodiazo compound of 2,6-dichloro-1,4-diaminobenzene containing 54% of the base, and to which there has been added the quantity of sodium acetate necessary for rendering the solution neutral to Congo paper; thereupon, the wool is after-treated in the usual manner.

A reddish brown dyeing is thus obtained.

The dyestuff corresponds to the following probable formula:

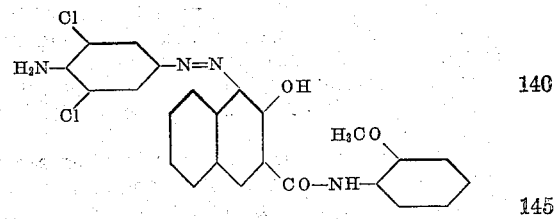

By using other 2,3-hydroxynaphthoic acid arylides, the process may be carried out in the same manner.

The following table indicates a number of other azodyestuffs obtainable according to the present invention:

duced on the fiber, dyeings of various shades and good fastness properties.

| | | 4-monodiazo compound of— | Coupled with— | Tint |
|---|---|---|---|---|
| 1 | | 2,6-dichloro-1,4-diaminobenzene | 2′,3′-hydroxynaphthoyl-: -1-amino-4-ethoxybenzene | Brownsih garnet. |
| 2 | | Do | -1-amino-2-ethoxybenzene | Red-brown. |
| 3 | | Do | -1-amino-2-methylbenzene | Do. |
| 4 | | Do | -1-amino-3-methyl-4-methoxybenzene | Reddish currant. |
| 5 | | Do | -2-aminonaphthalene | Brown-currant. |
| 6 | | Do | -1-aminonaphthalene | Blue-currant. |
| 7 | | Do | -2-amino-1-methyl-naphthalene | Currant. |
| 8 | | Do | -2-amino-3-methoxy-naphthalene | Brown-Bordeaux. |
| 9 | | Do | -2-amino-6-methoxy-naphthalene | Dark violet. |
| 10 | | Do | -1-amino-2-methoxy-anthracene | Garnet. |
| 11 | | Do | -4-amino-acenaphthene | Bluish currant. |
| 12 | | Do | -4-amino-biphenyl | Blue-violet. |
| 13 | | Do | -4-amino-diphenylamine | Garnet. |
| 14 | | Do | -2-amino-carbazole | Do. |
| 15 | | Do | -1-amino-4-chlorobenzene | Black-currant. |
| 16 | | Do | -1-amino-4-methoxybenzene | Black-violet. |
| 17 | | Do | -1-amino-3-nitrobenzene | Red-brown. |
| 18 | | Do | -1-amino-4-nitrobenzene | Garnet. |
| 19 | | Do | -1-amino-3-chloro-4,6-dimethoxybenzene | Dark brown. |
| 20 | | Do | 6′-bromo-2′,3′-hydroxynaphthoyl-1-amino-2-methoxybenzene. | Dark currant. |
| 21 | | Do | 6′-methoxy-2′,3′-hydroxynaphthoyl-1-amino-2-methoxybenzene. | Reddish black. |
| 22 | | Do | 8′-methoxy-2′,3′-hydroxynaphthoyl-1-amino-2-methylbenzene. | Garnet. |
| 23 | | Do | Bis-(2″,3″-hydroxynaphthoyl)-: -4,4′-diamino-3,3′-dimethoxy-diphenyl | Red-brown. |
| 24 | | Do | -1,4-diamino-2-methoxy-5-methylbenzene | Dark brown. |
| 25 | | 2,6-dibromo-1,4-diaminobenzene | 2′,3′-hydroxynaphthoyl-: -1-amino-2-methoxybenzene | Brownish Bordeaux. |
| 26 | | Do | -aminobenzene | Garnet. |
| 27 | | Do | -2-aminonaphthalene | Brownish garnet. |
| 28 | | Do | -1-aminonaphthalene | Dark currant. |
| 29 | | 2-chloro-6-bromo-1,4-diaminobenzene | -aminobenzene | Garnet. |
| 30 | | Do | -1-amino-2-ethoxybenzene | Brown. |
| 31 | | Do | -1-amino-2-methoxybenzene | Reddish brown. |
| 32 | | Do | -1-amino-4-methylbenzene | Red-brown. |
| 33 | | Do | -1-amino-2-methylbenzene | Violetish brown. |
| 34 | | Do | -2-aminonaphthalene | Brown-currant. |
| 35 | | Do | -1-aminonaphthalene | Dark currant. |
| 36 | | Do | -1-amino-3-chloro-4, 6-dimethoxybenzene | Dark brown. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble azodyestuffs of the following general formula:

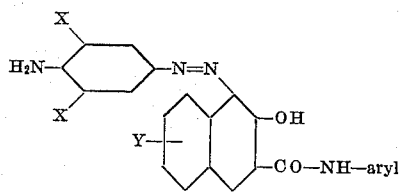

wherein X stands for halogen and Y for hydrogen, halogen or alkoxy, yielding, when produced on the fiber, dyeings of various shades and good fastness properties.

2. The water-insoluble azodyestuffs of the following general formula:

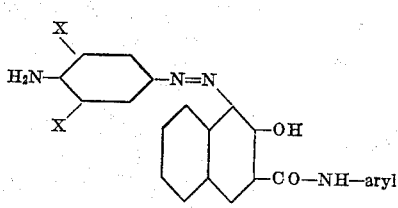

wherein X stands for halogen, yielding, when produced on the fiber, dyeings of various shades and good fastness properties.

3. The water-insoluble azodyestuffs of the following general formula:

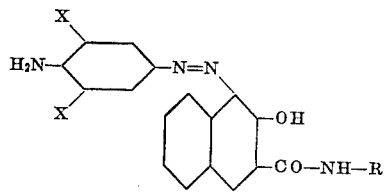

wherein X stands for halogen and R represents a radical of the benzene series, yielding, when produced on the fiber, dyeings of various shades and good fastness properties.

4. The water-insoluble azodyestuffs of the following general formula:

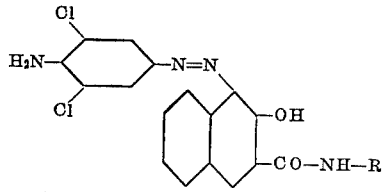

wherein R represents a radical of the benzene series, yielding, when produced on the fiber, dyeings of various shades and good fastness properties.

5. The water-insoluble azodyestuff of the following formula:

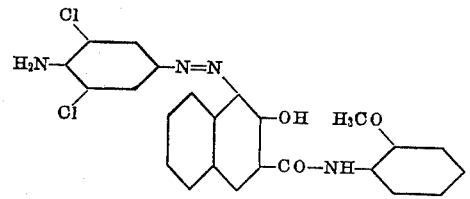

yielding, when produced on the fiber, a reddish brown dyeing of good fastness properties.

6. The water-insoluble azodyestuff of the following formula:

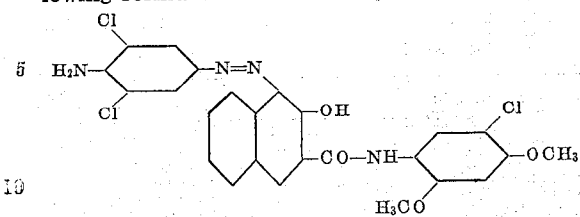

yielding, when produced on the fiber, a dark brown dyeing of good fastness properties.

7. The water-insoluble azodyestuff of the following formula:

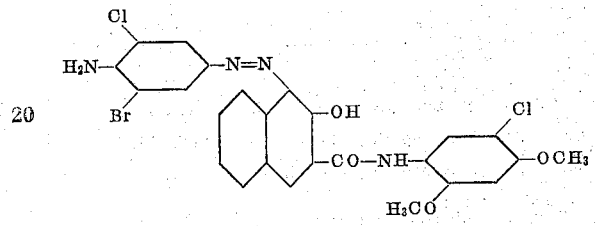

yielding, when produced on the fiber, a dark brown dyeing of good fastness properties.

8. Fiber dyed with the water-insoluble azodyestuffs as claimed in claim 1.
9. Fiber dyed with the water-insoluble azodyestuffs as claimed in claim 2.
10. Fiber dyed with the water-insoluble azodyestuffs as claimed in claim 3.
11. Fiber dyed with the water-insoluble azodyestuffs as claimed in claim 4.
12. Fiber dyed with the water-insoluble azodyestuff as claimed in claim 5.
13. Fiber dyed with the water-insoluble azodyestuff as claimed in claim 6.
14. Fiber dyed with the water-insoluble azodyestuff as claimed in claim 7.

KARL SCHNITZSPAHN.
WILHELM KOCH.